L. O. PILLSBURY.
MUD PULLER FASTENING.
APPLICATION FILED AUG. 20, 1913.

1,164,747.

Patented Dec. 21, 1915.
2 SHEETS—SHEET 1.

Witnesses

Inventor
L. O. Pillsbury
By H. L. Woodward
Attorney

L. O. PILLSBURY.
MUD PULLER FASTENING.
APPLICATION FILED AUG. 20, 1913.
1,164,747.
Patented Dec. 21, 1915.
2 SHEETS—SHEET 2.
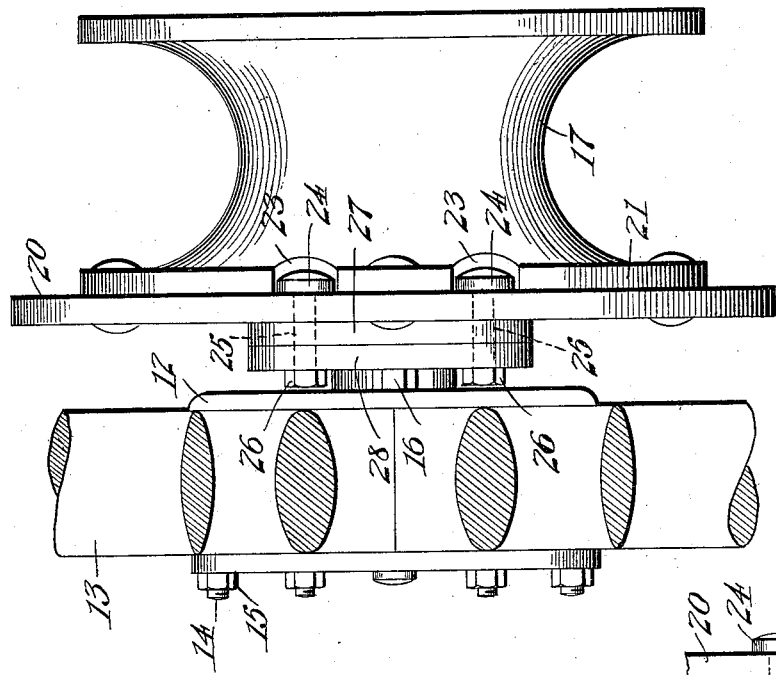
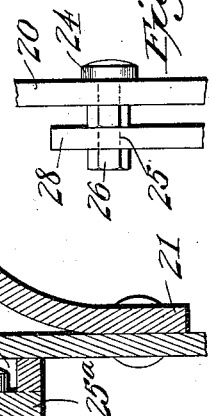
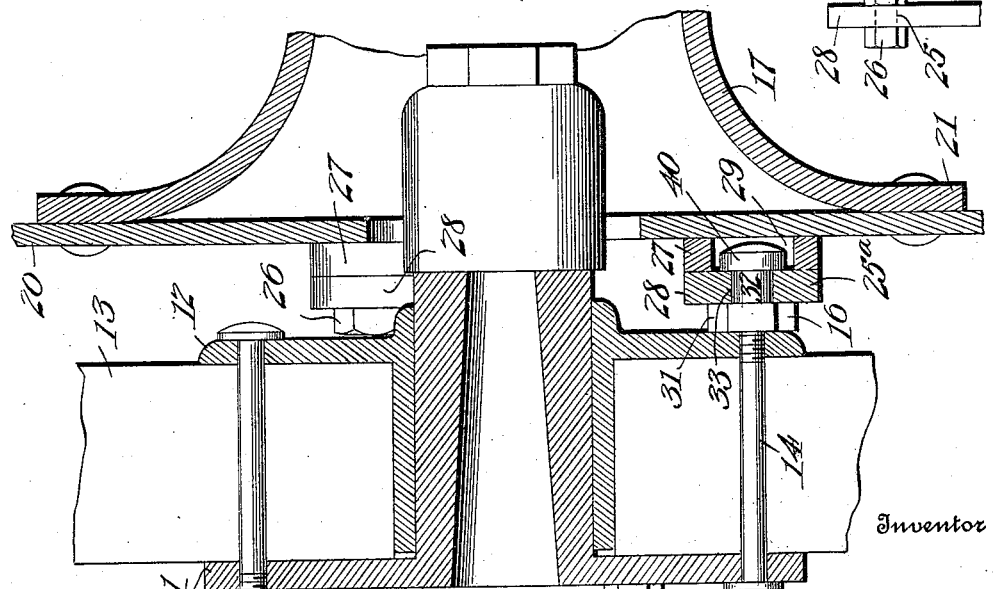
Witnesses
Inventor
L. O. Pillsbury
By H. S. Woodward
Attorney

UNITED STATES PATENT OFFICE.

LEONARD O. PILLSBURY, OF CROCKER, SOUTH DAKOTA.

MUD-PULLER FASTENING.

1,164,747.      Specification of Letters Patent.      Patented Dec. 21, 1915.

Application filed August 20, 1913. Serial No. 785,746.

*To all whom it may concern:*

Be it known that I, LEONARD O. PILLSBURY, a citizen of the United States, residing at Crocker, in the county of Clark and State of South Dakota, have invented new and useful Improvements in Mud-Puller Fastenings, of which the following is a specification.

This invention is an improvement on that shown in my copending application, Serial 691,249, filed April 16, 1912, and has for its especial objects the improvement of the manner of attachment and to make the drum readily applicable to wheels of any size without change of construction, either of the wheel or my appliance as supplied.

As is well known the usual wheel construction generally employed at this time includes a hub having two flanges between which the spokes are held, the flanges being bolted firmly against the spokes by means of bolts engaged therethrough and having respective nuts thereon outwardly of one of the flanges.

It is my purpose to enable the use of the same bolts employed in assembling the wheel to hold my puller in place. Further, as the assembling bolts of large wheel hubs are spaced in a greater circle than on small wheels, it is my purpose to provide means to enable the adjustment of the two-way slots of my first construction to suit the needs of the individual customers purchasing the appliance.

Figure 1:
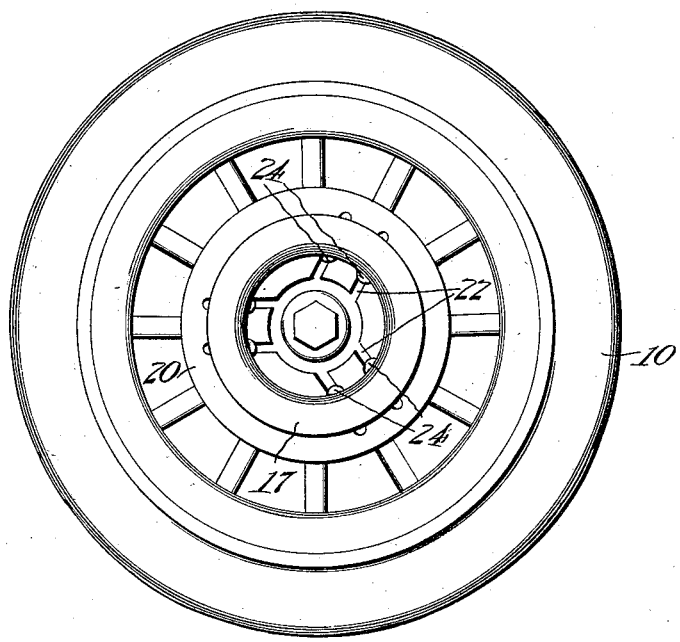
Figure 3:
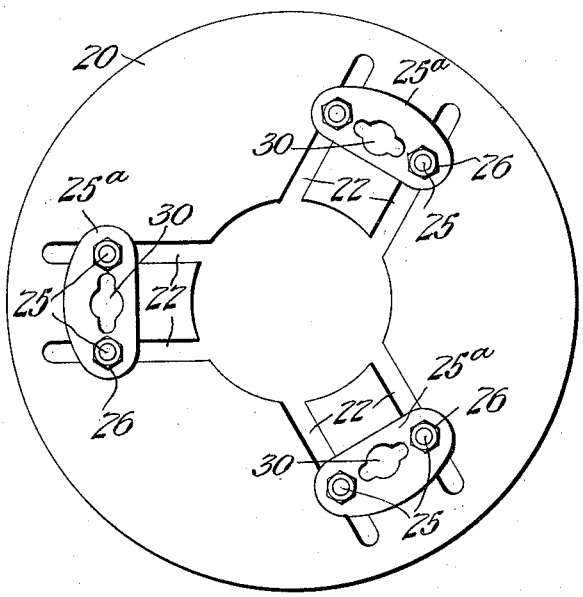

Additional objects and advantages will be apparent, some of them being understood from the following description and from the drawings, in which, Figure 1 is a side view of a wheel equipped with my invention, Fig. 2, is a fragmentary sectional view of a hub and part of a wheel, with my invention attached, Fig. 3 is a back view of my drum with the adjustable quick-detachable devices in place, Fig. 4 is an edge view of the hub with my device attached, Fig. 5 is a perspective of the special nut for the hub, interchangeable with the regular nut on the assembling bolts.

There is illustrated a wheel 10 of familiar construction, including the hub flanges 11 and 12 between which are confined the spokes 13 in the usual manner, the bolts 14 engaged through registered apertures in the flanges and through the spokes and having the nuts 15 of ordinary form engaged with certain of the bolts and nuts 16 to be described, engaged with the other bolts for the purpose.

It is understood that under the usual construction of such wheels all of the bolts are provided with nuts 15 at the inner side of the hub. In order to permit the attachment of my present device with rapidity and adapt the wheel therefor with a minimum of labor, I supply therewith the nuts 16, three of which are engaged with equally spaced bolts in the hub, the original nuts being first removed, and the bolts drawn from the front side of the hub and inserted from the back side, so that my special nuts may be located at the outer side of the wheel these nuts are equally applicable to use with the form of my invention shown in my previous application above mentioned. I provide a drum 17, which may be similar to that described in my said copending application, or any other suitable construction including an attaching flange adapted to be disposed parallel to the plane of the wheel to which it is to be attached, and closely thereadjacent. In this instance, I form the attaching flange 20 in the form of an annulus of sheet metal, and the drum proper is formed of another piece pressed to form the peripherally recessed annulus 21 the inner side of which is secured to the flange 20 by rivets, or otherwise. The flange is of somewhat greater diameter than the drum proper, as shown though these proportions are not arbitrary and it may not be found necessary in practice to make the flange so large, and it projects inwardly so as to accommodate the device to the smaller hubs to which it is to be attached, while yet allowing proper clearance for the reception of the outer parts of the larger hubs upon which it may be required.

The drum annulus 21 may be formed from pressed metal or cast, as most desirable. Equally spaced around the flange 20, there are three pairs of slots 22, parallel to respective radii of the flange and on each side thereof. These slots are shown opening on the inner edge of the annulus, but may be closed thereat if desired, this being a mechanical detail of construction not considered essential to illustrate. Where the slots pass close to the flange of the drum, the drum is provided with alined slots 23 wider than those 22 to permit the free passage thereunder of the heads 24 of bolts 25 the stems of which are disposed slidably in the slots 22.

These bolts carry the attaching blocks 25ª, which are engaged thereon in a suitable manner, to be held against the annulus by nuts 26 screwed upon the bolts. Thus the blocks may be held adjustably on the annulus and secured at any distance from its center. Each of the blocks 25ª comprises two plates, an inner one 27 next the annulus, and an outer one 28. The inner one has simply an enlarged slot 29 therein concentric with the annulus when adjusted intermediately of the slot, and being sufficiently large to clear well the head 40 on the nut 16 when the drum is positioned on the wheel.

The plate 28 is provided with a slot 30 similar to that in my first application before mentioned operating for the same purpose. The slot 30 is sufficiently large at the middle to freely receive the head 40 therethrough, but is reduced at each end so that movement of the nut toward either end will cause the reduced part of the slot to engage under the head, as will be described. The inner sides of these reduced parts of the slot 30 are preferably nearly concentric with the annulus at a point near the inner ends of the slots 22, and the outer sides concentric with the annulus at a point adjacent the outer ends of the slots 22, so that at any point in the adjustment of the device, it will be free to rotate in either direction for ready engagement of the reduced parts of the slots around the nuts 16 as will be described.

The nuts 16 each comprise the enlarged hexagonal nut base 31, by which they are adapted to be screwed into place tightly with little difficulty, outwardly from which there extends the reduced neck 32, carrying the head 40 before mentioned. The neck and head are bored and threaded to correspond with and form a continuation of the threaded opening through the base 31. The head is of a thickness slightly less than that of the plate 27, and the neck is sufficiently reduced to form a deep enough channel or groove 33 around the nut to allow full engagement of the sides of the reduced parts of the slots 30 under the head at any radius of adjustment of the blocks 25ª. The clearance between the head 40 and the base 31 is slightly greater than the thickness of the plate 28.

In use, when the device is purchased, the user removes the assembling nuts from three equally spaced flange bolts of the hub, takes out the bolts and inserts them from the inner side of the hub, and engages the nuts 16 thereon as shown. The distances between the centers of the readjusted bolts then being taken, the blocks 25 are adjusted with the centers of the enlarged parts of the slots 30 correspondingly spaced, and the nuts 26 properly tightened. The measurement may be obviated by leaving the nuts 26 slightly loosened, and presenting one of the blocks 25ª over a nut 16 and then sliding the others until they are similarly engageable, then adjust the whole device on the hub by tapping with a hammer or other object until the annulus 21 is concentrically spaced around the projecting barrel of the hub. The nuts 26 may then be tightened, and the device removed by rotating the drum on the wheel until the enlargements of the slots 30 permit its withdrawal.

The device is normally carried in the tool box of the vehicle, and when required for use is simply presented against the wheel around the hub so that the slots 30 pass over the nuts 16, and rotated slightly in the opposite direction from that in which the wheel is to rotate in operating the device, after which it will be held securely in place under the action of the rope or cable wound on the drum.

My invention comprises few parts, and those of such simple nature that it may be made very light, not to say cheaply. The processes of making the several elements are extremely simple, so that its manufacture may be accomplished economically.

What is claimed is:

1. A device of the class described comprising a drum, radially adjustable attaching blocks thereon having concentric channels an opening through each centrally of the channel and reduced slots adjacent each end of the channels, and nut elements having outwardly disposed heads, and adapted for engagement upon the assembly bolts of a hub as described, the heads being adapted for sliding engagement in said channels and to be held under the sides of said slots.

2. A device of the class described comprising a drum including a plane flange portion having equispaced pairs of parallel slots extending from the inner part toward the outer part of the flange, attaching blocks disposed across respective pairs of the said slots, headed bolts engaged through the slots and through the blocks, means to clamp the blocks against the flange, said blocks each having a channel therein concentric with the drum approximately, each block having a central opening therethrough and reduced slots over each end of the channel, and headed members adapted for engagement with a wheel, for presentation in the channels as described and engagement under the sides of said slots, for removal under partial rotation of the drum.

3. The combination with a wheel including parallel flanges and spokes clamped therebetween and including assembling bolts having nuts on their ends, of nut members interchangeable with those first mentioned and having reduced axial necks extending outwardly thereof, enlarged heads carried at the outer ends of the necks, and a drum member including portions having concentric slots therein enlarged centrally for free engagement over said heads, and having reduced portions at each end for snug engagement upon the necks, for the purposes described.

In testimony whereof I have hereunto set my hand in presence of two subscribing witnesses.

LEONARD O. PILLSBURY.

Witnesses:
H. L. SLITER,
A. W. HARRINGTON.

Copies of this patent may be obtained for five cents each, by addressing the "Commissioner of Patents, Washington, D. C."